Feb. 6, 1923.
R. HERRMANN.
SCLEROSCOPE.
ORIGINAL FILED JULY 28, 1920.
1,444,607.
2 SHEETS—SHEET 1.
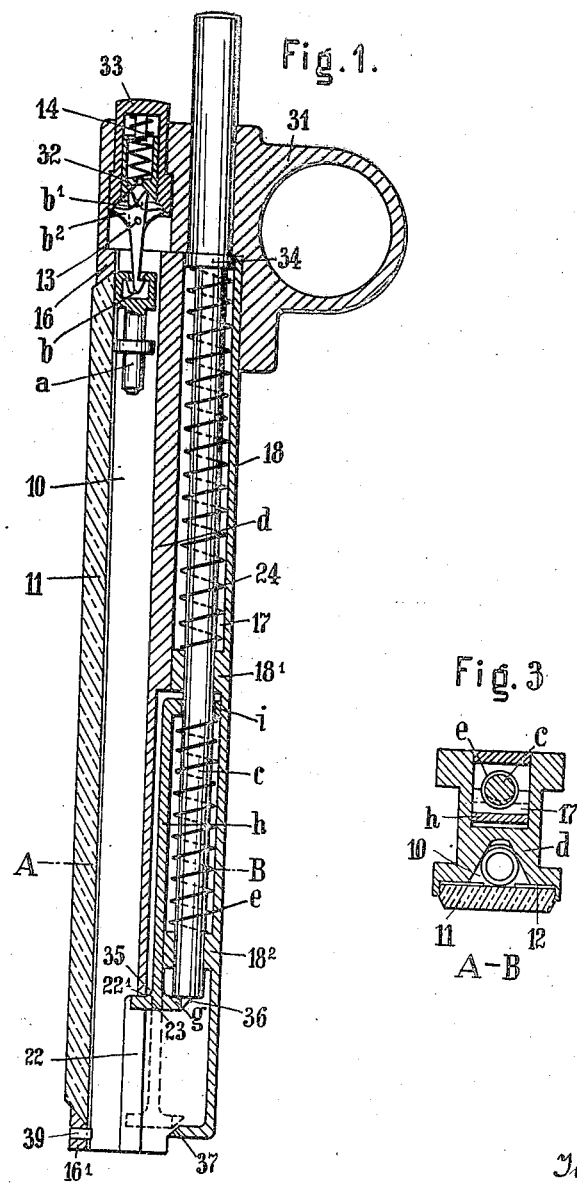
Inventor
Richard Herrmann
By
Attorney Feb. 6, 1923.
R. HERRMANN.
SCLEROSCOPE.
ORIGINAL FILED JULY 28, 1920.
1,444,607.
2 SHEETS—SHEET 2.
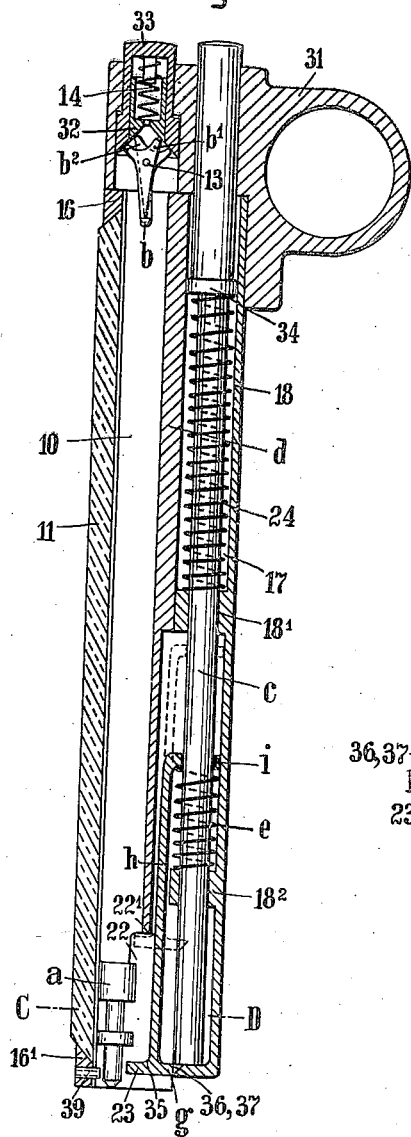
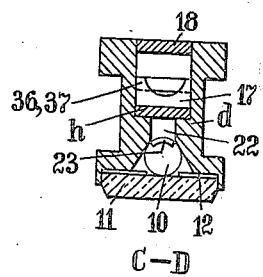
Inventor
Richard Herrmann
By
Fred'k F. Schuetz
Attorney Patented Feb. 6, 1923.

1,444,607

UNITED STATES PATENT OFFICE.

RICHARD HERRMANN, OF BERLIN, GERMANY, ASSIGNOR TO SCHUCKARDT & SCHÜTTE, OF BERLIN, GERMANY, A FIRM.

SCLEROSCOPE.

Original application filed July 28, 1920, Serial No. 399,645. Divided and this application filed August 13, 1921. Serial No. 493,400.

*To all whom it may concern:*

Be it known that I, RICHARD HERRMANN, a citizen of Germany, and resident of Berlin, in the State of Prussia, German Empire, have invented certain new and useful Improvements in Scleroscopes, of which the following is a specification.

The invention relates to a scleroscope or apparatus for testing the hardness of solid bodies, more particularly metals, by means of a falling weight.

It has already been suggested for scleroscopes to guide a dropping weight or hammer provided with a hard point, in a glass tube provided with graduations, and to return it to the top of the tube by pneumatic means into a device for catching and retaining it. Owing to the use of pneumatic means, the glass tube had to be closed up, so that its wall between the scale marked on the outside of the glass tube and the weight formed an obstacle to the exact reading of the scale. Errors in reading were likely to be caused owing to reflection or refraction.

Moreover the glass tube is very fragile. The pneumatic device used for returning the weight into the catching device, was constituted in these instruments by a rubber ball and tube. It easily became leaky, and moreover, rubber cannot always be obtained of the desired quality, and is a comparatively expensive material.

This invention relates to a scleroscope in which the weight slides in a preferably metal guide. For returning the weight to its original position a mechanical spring-operated driver is used.

The guide track for the falling weight or hammer is in the apparatus according to the invention of prismatic shape and preferably made practically three-sided and covered on the open side with glass or some other transparent material, owing to which it is prevented from becoming dirty. The hammer engages its guide only along lines, so that the engaging surfaces are kept clean by the hammer, and air can move freely past the falling hammer through the corners of the prism. In this way, the height of rebound of the hammer is increased by more than 10% compared to the older devices, and therefore the accuracy of measurements is correspondingly increased. The device returning the falling hammer to its original position is carried by means of an extension through a corner of the guide prism, so that the guide for the hammer is continuous throughout the whole of its length, and no lateral deviation of the falling hammer, which would affect the accuracy, can take place.

The release of the hammer and the operation of the returning device take place perfectly independently of each other. In that way, when the hammer is released, the comparatively powerful returning spring need not be compressed, and the releasing device can be operated by a very slight pressure of the finger, so that there is no risk of forcing the device out of its vertical position when operating it without supports.

Moreover, the returning device is so constructed that when it is operated, the returning part is automatically released by a stop, after the returning spring has been compressed by the movement of a spring-controlled rod. After the return, the returning device again comes into engagement with its operating device.

In the accompanying drawings:

Fig. 1 is a vertical longitudinal section showing a construction of the apparatus in the position of rest.

Fig. 2 is a vertical longitudinal section through the apparatus at the moment of release of the returning device. The highest position of the returning device before it reaches the position of rest, is shown in dotted lines.

Fig. 3 is a cross-section on the line A—B of Fig. 1, and

Fig. 4 is a cross-section on the line C—D of Fig. 2.

Similar characters of reference designate corresponding parts throughout the several views.

In the construction shown, in the front of the body $d$ of the apparatus is arranged a prismatic, preferably three-sided guide for the hammer $a$, which is covered in front by a strip of glass 11. The glass strip 11 is arranged in a groove of the body $d$ and held at the top and at the bottom by covering plates 16 and 16'. On the upper end of the body $d$ is mounted a head 31 in which above the guide 10 are pivoted about a pin 13 two catches or hooks $b$. The catches are provided at the top with projections $b'$ and $b^2$. Against the projections $b'$ is pressed by a spring 14 a sleeve 32 which has a hollow conical surface at the bottom. The projections $b'$ are thus moved inwards towards each other and the hooked bottom ends of the catches, which engage with a hollow space or recess of the hammer, are spread out (Fig. 1). The said sleeve 32 is surrounded by a pressure sleeve 33 which is adjustably mounted in the head 31. It is pressed upwards by the action of the spring 14 until its projection engages with a corresponding projection of the bore. The pressure sleeve 33 has at the bottom an also hollow conical surface with which the catches $b$ engage with their lateral projections $b^2$. If the sleeve 33 is pressed downwards in opposition to the action of the spring 14, its hollow conical surface will move the catches in the direction opposite to that in which they are moved by the sleeve 32, and the hooked bottom ends of the catches are moved towards each other, until their hook-shaped ends are disengaged from the hammer so that the latter is released and drops (Fig. 2).

In the head 31 is guided also the upper end of the rod $c$ operating the returning device. Its lower thin end engages with the groove 17 in the rear part of the body $d$. It is moved upwards by the spring 24 until it strikes by means of a collar 34 against the bottom surface of the head 31.

The bottom end of the pressure rod $c$ which is guided in the projections 18' and 18$^2$ of the rear covering plate 18 of the apparatus, rests on a projection $g$ at the lower end of the returning device $h$ which at its upper end is provided with an annular projection $i$ which loosely surrounds the rod $c$. Between the said annular projection and the projection 18$^2$ of the rear covering plate is arranged the returning spring $e$. It presses the returning device upwards so that it strikes with a cam face 35 the upper edge 22' of the slot 22 through which the returning device passes into the hammer guide. In this way the projection $g$ of the returning member is held fast under the rod $c$. The projection $g$ of the returning member is also provided with a cam face 36, and a further cam face 37 is arranged on a projection at the bottom end of the rear covering plate 18.

The operation of the apparatus is as follows:

On the rod $c$ being depressed, it acts on the projection $g$ of the returning device and drives the latter down, the spring $e$ between the projection $i$ and the projection 18$^2$ being compressed. As soon as the cam face 36 of the projection $g$ strikes the cam face 37, these two faces slide on each other, and the bottom end of the returning device is forced aside, transversely to its direction of movement, and through the slot 22 into the path of the hammer, until the projection 23 of the returning device engages under the hammer, and the projection $g$ slides off the lower end of the rod $c$ and thus becomes free (Fig. 2). The returning device is then projected upwardly, by the expanding spring $e$ and slides along the rod $c$. In this way, during the whole of the upward movement, the driver 23 of the returning device is positively guided in the guide of the hammer $a$ and drives the latter upwardly. As the rear face of the projection $g$ engages with the rod $c$, the lower end of the returning device at first remains in the position in which the driver 23 projects into the path of fall of the hammer. On the rod $c$ being then released, it is again raised by the spring 24 until the collar 34 engages with the head 31. In that way the projection $g$ of the returning device is released by the lower end of the rod $c$, so that the spring $e$ forces the returning device still further upwards. The cam face 35 slides during that movement on the edge 22', owing to which the returning device is sent back again to the position of rest in which the projection $g$ engages under the lower end of the rod $c$. The returning device is now outside the path of the hammer $a$ and the apparatus is ready to be used again.

It will be seen that in this construction the hammer can be easily removed from the guide after removing a stop pin 39 which is intended to prevent it accidentally falling out.

The present application is a division of my co-pending application Serial No. 399,645, filed July 28, 1920.

I claim:

1. In a scleroscope: the combination with a hammer adapted to be released, means for normally holding the hammer and a casing; of a returning device movable in the casing and adapted to engage therewith to be released; and resilient means to actuate said returning device.

2. In a scleroscope: the combination with a hammer adapted to be released, means for normally holding the hammer and a casing; of a returning device movable in the casing and adapted to engage therewith to be released; a returning spring compressible by the returning device; and a spring controlled rod to move the returning device to effect compression of its said returning spring and to effect its release.

3. In a scleroscope: the combination with a hammer adapted to be released, means for normally holding the hammer and a casing; of a returning device movable downwardly in the casing and transversely thereto thru engagement therewith; and resilient means to actuate said returning device.

4. In a scleroscope: the combination with a hammer; adapted to be released, means for normally holding the hammer and a casing; of a returning device movable downwardly in the casing and transversely thereto thru engagement therewith; a returning spring compressible by the returning device; and a spring controlled rod to move the returning device to effect compression of its said spring and to effect its release.

5. In a scleroscope: the combination with a hammer; adapted to be released, and means for normally holding the hammer of a returning device; a spring adapted to be compressed thereby; a spring controlled rod to effect the compression of the said returning spring; a projection on the lower end of said returning device and upon which said rod rests, said returning device being longitudinally and transversely movable; and a projection adapted to engage with the said projection of the returning device and force the latter aside in its lowest position to thereby release its compressed spring.

6. In a scleroscope: the combination with a hammer; adapted to be released, and means for normally holding the hammer of a returning device; a projection thereon having a cam face; a casing having a cam face, said came faces being adapted to strike each other in the lowest position of the returning device to release the latter.

7. In a scleroscope: the combination with a hammer; adapted to be released, means for normally holding the hammer and a casing; of a returning device movable downwardly in the casing and adapted to engage therewith to be released; a projection on said returning device; a releasing rod adapted to rest on said projection; and a stop on said casing to return the said projection over the releasing rod when the returning device has reached its highest position.

8. In a scleroscope: the combination with a hammer; adapted to be released, and means for normally holding the hammer of a returning device; a projection having a cam face thereon; a releasing rod resting upon said cam face and a slot, the projection being adapted to strike the upper edge of the guide slot of the casing and to slide along said edge to guide the returning device with its projection and cam face under the rod.

9. In a scleroscope: the combination with a hammer; adapted to be released, and means for normally holding the hammer of a returning device; a projection from same having a cam face thereon; a casing having a cam face and a slot, said cam faces being adapted to strike each other in the lowest position of the returning device to release the latter; a spring adapted to be compressed by the returning device; a spring controlled releasing rod resting upon the cam face of the returning device to effect the compression of the said returning spring, the returning device being longitudinally and transversely movable and forced aside in its lowest position to release its compressed spring by the engagement of the cam face of its projection with the cam face of the casing, and its said projection being adapted to strike the upper edge of the guide slot of the casing and to slide along said edge to guide the returning device with its projection and cam face under the releasing rod.

Signed at Berlin in the State of Prussia, German Empire, this 29th day of July A. D. 1921.

RICHARD HERRMANN.

Witnesses:
 GEORGE RIELLY,
 JOHANNES FRITZE.